United States Patent
Maniar et al.

(10) Patent No.: US 11,692,471 B1
(45) Date of Patent: Jul. 4, 2023

(54) METHOD FOR CONTROLLING AN E-COMPRESSOR AND AN E-CATALYST TO REDUCE EMISSIONS FROM AN INTERNAL COMBUSTION ENGINE

(71) Applicant: Garrett Transportation I Inc., Torrance, CA (US)

(72) Inventors: Malay Maniar, Böblingen (DE); Jens Keuler, Leonberg (DE); Surya Yadla, Baden-Württemberg (DE)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/661,865

(22) Filed: May 3, 2022

(51) Int. Cl.
| | |
|---|---|
| *F01N 3/20* | (2006.01) |
| *F01N 3/32* | (2006.01) |
| *F01N 9/00* | (2006.01) |
| *F01N 3/22* | (2006.01) |

(52) U.S. Cl.
CPC .......... *F01N 3/2013* (2013.01); *F01N 3/323* (2013.01); *F01N 9/00* (2013.01); *F01N 3/225* (2013.01); *F01N 2610/085* (2013.01); *F01N 2900/10* (2013.01); *F01N 2900/1602* (2013.01)

(58) Field of Classification Search
CPC .......... F01N 3/2013; F01N 3/323; F01N 9/00; F01N 2900/10; F01N 2900/1602; F01N 3/225; F01N 2610/085
See application file for complete search history.

(56) References Cited

U.S. PATENT DOCUMENTS

| | | | |
|---|---|---|---|
| 2017/0162407 A1* | 6/2017 | Swanson | H05B 1/0233 |
| 2018/0291827 A1* | 10/2018 | Disaro' | F02D 41/0007 |
| 2018/0340480 A1* | 11/2018 | Mehta | F01N 3/2013 |

* cited by examiner

*Primary Examiner* — Brandon D Lee
(74) *Attorney, Agent, or Firm* — John C. James

(57) ABSTRACT

In an internal combustion engine system having an emissions control system including an electrically heated catalyst (E-cat) and an E-compressor (either standalone or part of an E-turbocharger), a method for operating the emissions control system includes predicting that a cold start of the engine is imminent, activating the E-cat and the E-compressor in response to the prediction, and monitoring a characteristic parameter Pe of the E-cat as it changes. The E-compressor speed Nc is regulated to change in proportion to the changing Pe while the E-cat is activated. If no engine start occurs, the E-cat is deactivated, and speed Nc is regulated to track the changing Pe.

12 Claims, 4 Drawing Sheets

METHOD FOR CONTROLLING AN E-COMPRESSOR AND AN E-CATALYST TO REDUCE EMISSIONS FROM AN INTERNAL COMBUSTION ENGINE

BACKGROUND OF THE INVENTION

This application relates generally to internal combustion engine (ICE) systems, and relates more particularly to engine systems having a catalytic treatment device for reducing emissions of undesirable components in the engine exhaust gases that are discharged to atmosphere.

Catalytic treatment devices are effective for reducing emissions when they are operating at a sufficient temperature to activate or "light" the catalyst. After a cold start of the engine, however, initially the catalyst is well below its light-off temperature and hence is ineffective at reducing emissions. For this reason, it is known to employ an E-catalyst or "E-cat" in the system, typically as an additional component upstream of the main catalytic treatment device. An E-cat comprises a catalyst arranged in close proximity to an electrical heater. The heater can be switched on to rapidly heat up the catalyst, with the goal of reaching the light-off temperature quickly enough to be effective at reducing emissions of the exhaust gases produced right after the cold start. In some cases, the E-cat may remain active for a short time after engine start in order to help the main catalyst reach its operating temperature more quickly.

It is also known to equip such an engine system with an additional or secondary air pump (SAP) that blows air through the E-cat to distribute the heat produced by the electrical heater through the catalyst. Ideally, when a driver is preparing to start the engine, the SAP and the E-cat should be activated even before ICE ignition occurs so that by the time the engine is actually started, the E-cat (and/or the main catalyst) will be close to or at its light-off temperature. To that end, various sensors and control logic schemes can be employed for predicting that the engine will be started shortly.

Such use of SAPs and E-cats is effective for helping to control emissions after a cold start. There remains a need in the art, however, for improved strategies for regulating the operation of a SAP and E-cat to optimize the emissions-reducing effectiveness of the system.

SUMMARY OF THE DISCLOSURE

In accordance with one embodiment of the invention, a method is described for operating a secondary emissions control system in an exhaust system of an internal combustion engine (ICE). The secondary emissions control system includes an E-cat comprising a catalyst disposed on a substrate and an electrical heating device proximate the catalyst, and further includes an E-compressor comprising a compressor operably coupled with an electric motor for rotatably driving the compressor. The method comprises the steps of:
  receiving a command to activate the secondary emissions control system;
  upon receipt of said command, activating the electrical heating device of the E-cat and activating the E-compressor to supply air to the E-cat;
  monitoring a characteristic parameter Pe of the E-cat as a function of time as the electrical heating device heats the catalyst; and
  while the electrical heating device is activated, regulating speed Nc of the E-compressor in a manner to change Nc responsive to change in Pe.

In some embodiments the method can further comprise the steps of receiving a command to deactivate the secondary emissions control system, and accordingly deactivating the E-cat. While the electrical heating device of the E-cat is deactivated, speed Nc of the E-compressor is regulated in a manner to change Nc responsive to change in Pe.

Upon detecting that Pe has reached a predetermined lower threshold value, the method can include the step of ramping the speed Nc of the E-compressor down to zero.

The E-cat parameter Pe can be derived in various ways. In some embodiments, the parameter can be an E-cat temperature Te computed based at least in part on a predetermined relationship between input power to the E-cat and elapsed time since activating the E-cat. The predetermined relationship can also factor in ambient temperature, and generally is dependent on the characteristics of the E-cat. Alternatively, the parameter can be E-cat resistance (voltage divided by current).

As an alternative to the use of E-compressor speed Nc, the method can employ E-compressor torque Q as the control variable.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
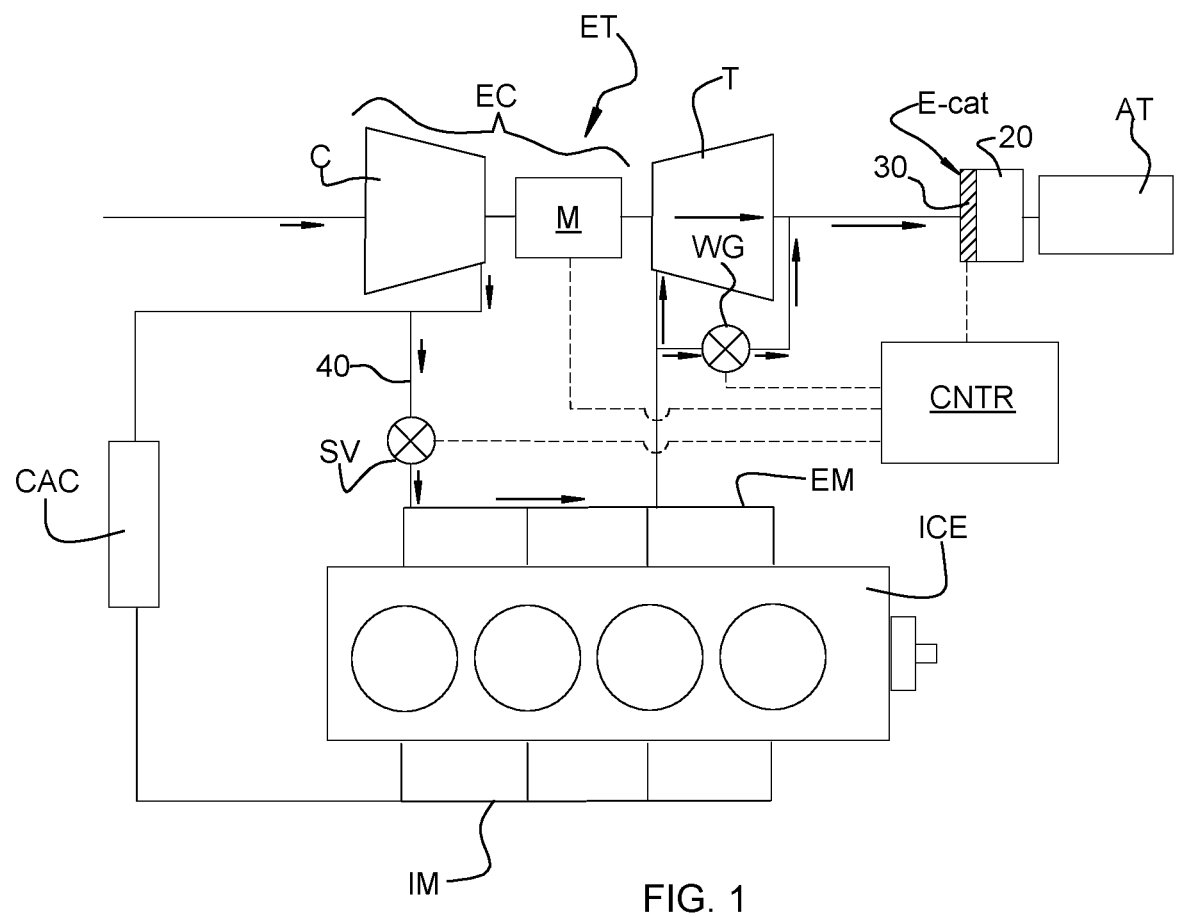
FIG. 1 is a diagrammatic depiction of an engine system having an E-turbocharger and an E-cat, showing the system configured for pre-start activation of the secondary emissions control system in accordance with embodiments of the invention.

FIG. 1 depicts one exemplary engine system to which the methods of the present invention may be applied. The system includes an internal combustion engine ICE, and an E-turbocharger ET comprising an E-compressor EC and a turbine T connected to each other by a common shaft so that the turbine drives the compressor when the engine is running and supplying exhaust gases to the turbine. The E-turbocharger further includes an electric motor M operably coupled to the same common shaft so that under some operating conditions the motor can be activated to drive the compressor C, or to help drive the compressor in the case of the engine running such that the turbine supplies some of the power driving the compressor. Accordingly, the compressor C and motor M are collectively referred to as an E-compressor EC. The compressor receives ambient air, compresses it, and supplies it to an intake manifold IM of the engine, for supply to the cylinders of the engine. Optionally, the compressed air can be passed through a charge air cooler CAC prior to the intake manifold. When the engine is running, exhaust gases from the cylinders are collected in an exhaust manifold EM, from which they are fed to the turbine T. The system also can include a waste gate WG operable for causing some of the exhaust gases from the engine to bypass the turbine when the waste gate is opened. After passing through (and/or bypassing) the turbine, the exhaust gases are passed through a main after-treatment device AT having a catalyst for converting undesirable components of the exhaust gases into products such as carbon dioxide and water.

The system of FIG. 1 also includes a secondary emissions control system including an E-cat, that is, a device comprising a catalyst 20 disposed on a substrate of large surface area (e.g., a honeycomb structure), and an electrical heating device 30 in close proximity to the catalyst. Activation of the heating device causes the catalyst of the E-cat to be heated. When the catalyst reaches its light-off temperature, it is then effective for treating the exhaust gases. Typically the E-cat is in series with the main after-treatment device AT, being located just upstream of the main device. The secondary emissions control system also includes the E-compressor EC, and a secondary air injection (SAI) valve SV disposed in a line 40 connected between the main air duct from the compressor and the engine exhaust system. Opening the SAI valve causes compressed air from the E-compressor to be injected into the exhaust system of the engine, such as into the exhaust manifold as shown in FIG. 1, or alternatively into the exhaust system upstream or downstream of the turbine (not shown). Before engine start, the SAI valve and the waste gate WG (if present) can be opened, and the E-compressor can be activated, causing the E-compressor to pressurize air and supply it through the SAI line 40 and the exhaust manifold EM, then through the waste gate into the exhaust line that feeds into the E-cat, as indicated by the arrows in FIG. 1. Some air may also flow through the turbine T to the E-cat. In some systems, particularly those having an E-turbo, there may not be any waste gate. Operation of the turbine may be accomplished via regulation of the E-turbo. It is also possible to employ a turbine having a variable turbine nozzle for turbine regulation.

The system of FIG. 1 further includes a controller CNTR connected to the heater 30 of the E-cat, the motor M, the SAI valve SV, and the waste gate WG. The controller is programmed with machine-readable instructions for performing steps of the methods of the invention, via control signals sent to each of the E-cat heater, motor, SAI valve, and waste gate (or variable turbine nozzle) for controlling operation of these devices.

When the engine is started from a cold state (referred to as a "cold start" of the engine), emissions of the engine are problematic because the catalyst of the main after-treatment device is below the temperature at which the catalyst becomes effective (the so-called "light-off temperature"). It requires a significant amount of time after the engine is started for the exhaust gases from the engine to heat the main catalyst to its light-off temperature. During this time period, emissions out the tail pipe can be far higher than desired. The secondary emissions control system is advantageous because it can reach its light-off temperature more quickly than can the main after-treatment device.

The present application concerns methods for operating the secondary emissions control system to achieve benefits not known to be achieved with prior-art control methods. In prior-art engine systems having an E-cat, air typically is supplied to the E-cat by a standalone secondary air pump (SAP) that runs at constant speed (therefore constant volumetric flow rate), or in some cases at constant power (therefore variable volumetric flow rate as pressure changes). Air flow to the E-cat is regulated by means of a variable valve. With typical valves, the relationship between degree of valve opening and air flow rate through the valve is highly non-linear. Accordingly, using a valve for air flow rate regulation is difficult to accomplish with accuracy.

The methods in accordance with the invention employ an E-compressor that is controllable to run at variable speeds via regulation of the electric motor of the E-compressor. Speed control can be achieved quite accurately, and therefore air flow rate control can be very accurate, since the volumetric flow rate of air is proportional to compressor speed. Additionally, the methods of the invention employ a compressor speed profile that facilitates rapid heat-up of the catalyst of the E-cat in an advantageous fashion.

Figure 3:
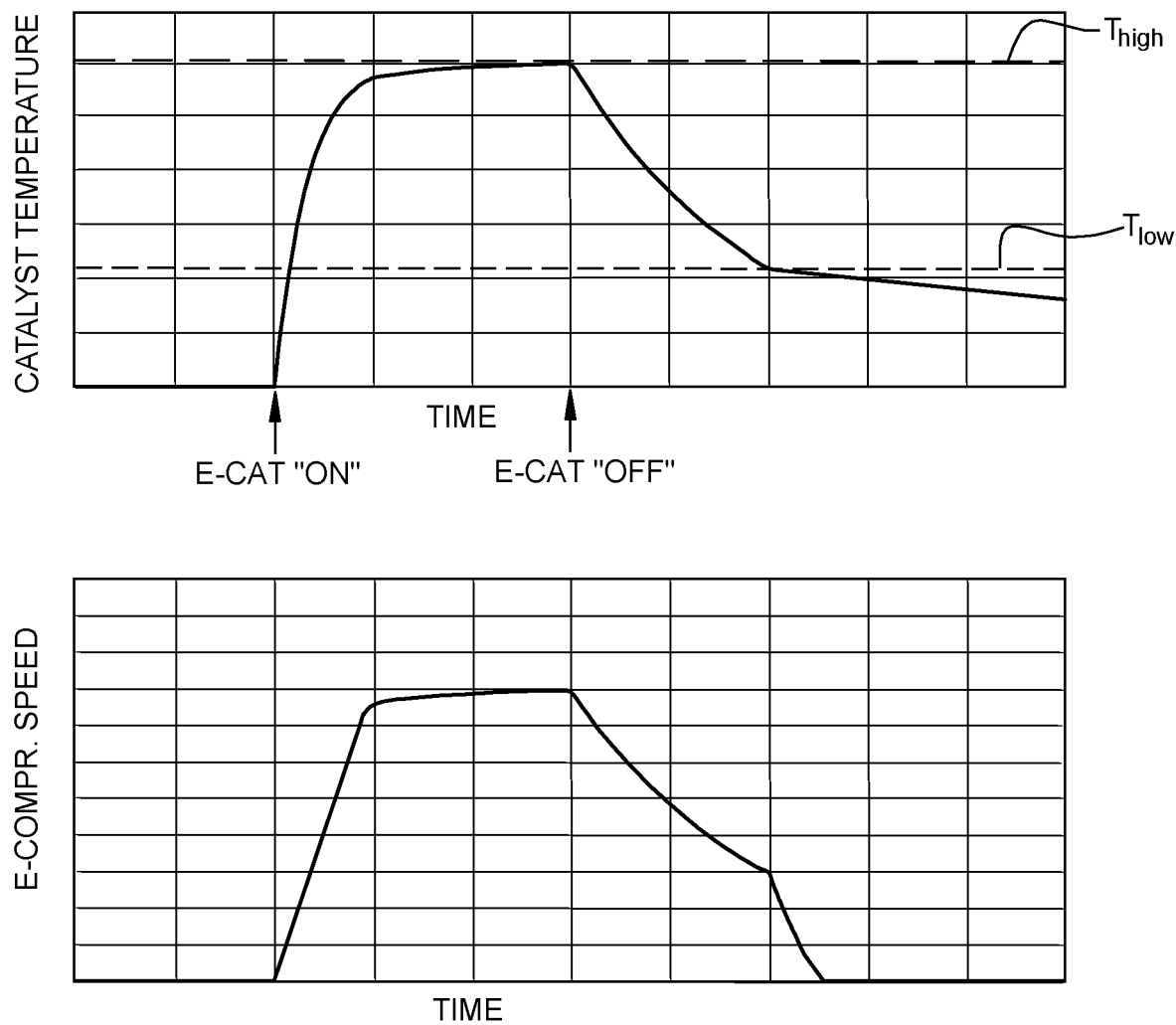
FIG. 3 is a graph depicting E-cat temperature and E-compressor speed characteristics in accordance with an embodiment of the invention.

With reference to FIG. 3, a compressor speed profile in accordance with one embodiment of the invention is illustrated. The upper graph shows catalyst temperature as a function of time, and the lower graph shows E-compressor speed. The upper dashed line represents a target high temperature at which the catalyst becomes effective for treating the exhaust gases. When the E-cat is turned on, the catalyst temperature at first increases rapidly. Tracking this temperature increase, the E-compressor is controlled so that its speed increases in proportion to the increase in catalyst temperature. A short time later, the rate of increase in catalyst temperature decreases, and in response the compressor speed's rate of increase is reduced proportionately. In the scenario shown in FIG. 3, the engine is never started (e.g., the driver exits the vehicle with the key, without starting the engine); once the E-cat reaches the target high temperature, the E-cat is turned off, and the temperature of the catalyst begins to decrease. Correspondingly, the E-compressor speed is regulated to decrease proportionately to the temperature decrease. The lower dashed line in the upper graph represents a target low temperature. When the catalyst reaches the low temperature target, E-compressor speed is then rapidly ramped down to zero, and the SAI valve and waste gate are closed.

Of course, if the driver actually starts the engine while the E-cat is activated, then once the E-cat temperature reaches the high temperature target, the E-cat and the E-compressor can be deactivated, the SAI valve can be closed, and control of the E-turbocharger or E-compressor can be returned to the main engine control unit according to conventional control schemes for turbocharged engine systems. In some cases, the E-cat may remain active for a short time after engine start to assist in the heat-up of the main catalyst.

Figure 2:
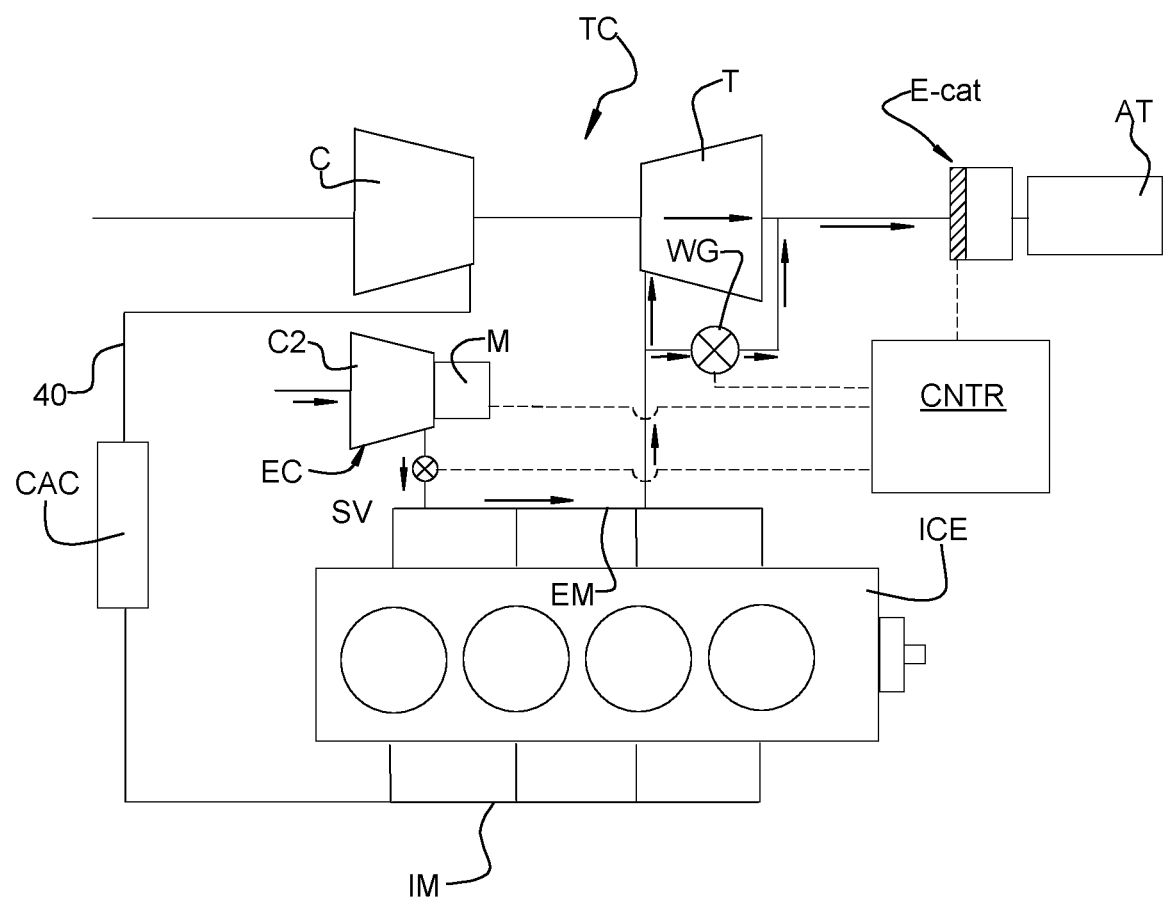
FIG. 2 is a diagrammatic depiction of an engine system generally similar to that of FIG. 1, but having a conventional turbocharger plus an E-compressor for supplying the air to the E-cat, showing the system configured for pre-start activation of the secondary emissions control system in accordance with embodiments of the invention.

The invention is not limited to the use of an E-turbocharger as shown in FIG. 1. FIG. 2 shows an alternative engine system in which the invention may be practiced. In the second embodiment of engine system, a standalone E-compressor EC is employed, and the turbocharger TC is a conventional turbocharger driven by exhaust gases alone. The E-compressor comprises a second compressor C2 coupled with an electric motor M. Pressurized air from the E-compressor can be injected into the engine exhaust system by opening the SAI valve SV, and then fed to the E-cat by opening the waste gate WG, similar to the first embodiment. The controller is connected to the SAI valve, the motor of the E-compressor, the waste gate valve, and the E-cat heater. Operation of the system according to FIG. 2 is otherwise substantially the same as operation of the first embodiment.

Figure 4:
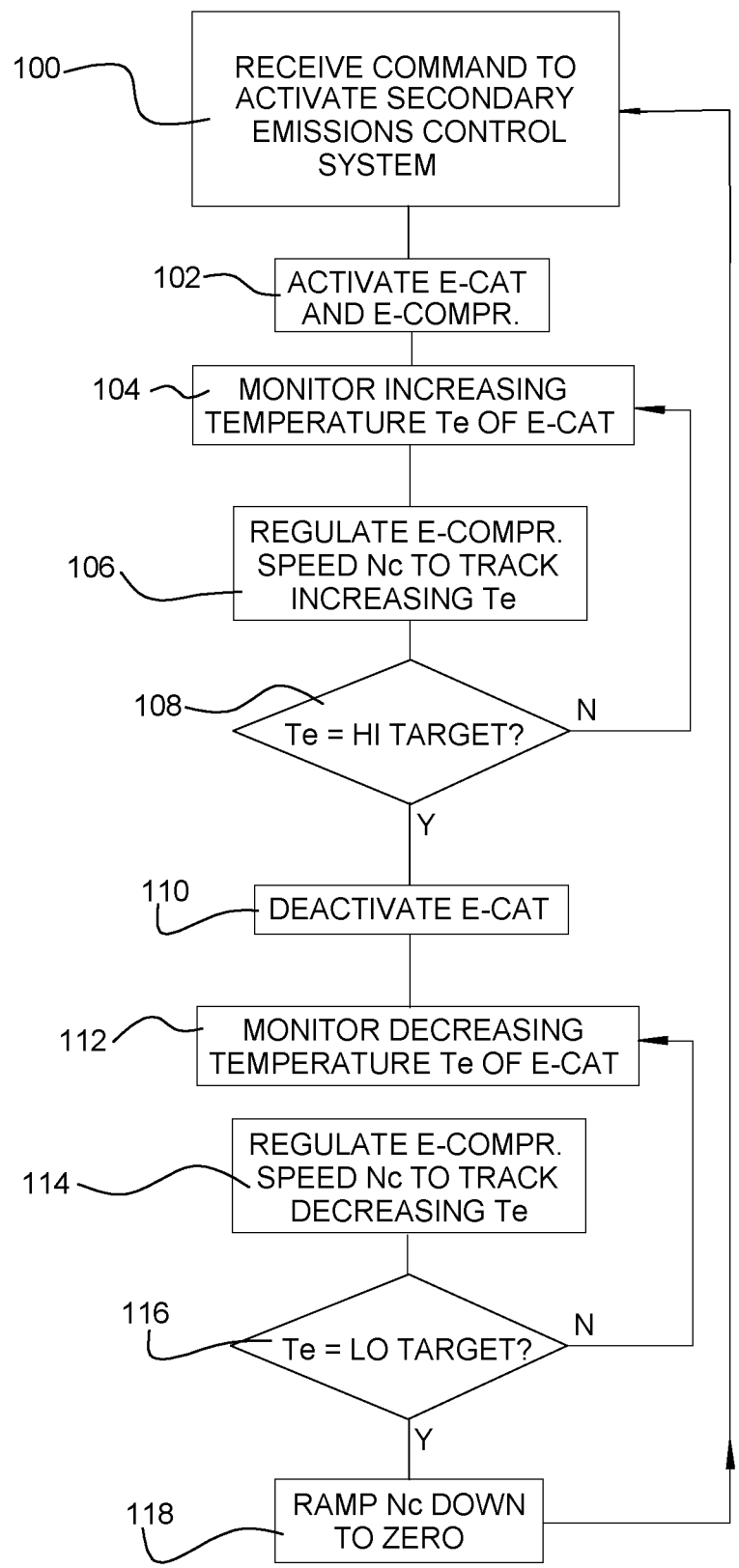
FIG. 4 is a flow chart illustrating a method for operating an emissions control system in accordance with an embodiment of the invention.

FIG. 4 is a flow chart showing steps of a method in accordance with an embodiment of the invention. In step 100, a controller for the secondary emissions control system receives a command from the main ECU to activate secondary air injection. In response, the controller in step 102 activates the E-cat and the E-compressor. The E-cat will begin to heat up as previously described in connection with FIG. 3. In step 104, the temperature of the E-cat is continually monitored, as further described below. At step 106, speed of the E-compressor is regulated to track the increasing temperature of the E-cat. In other words, increases in E-compressor speed are proportionate to increases in E-cat temperature. In step 108, it is queried whether the current E-cat temperature is equal to a target high temperature at which the E-cat becomes effective for treating exhaust gases. The target high temperature is stored in the memory of the controller. If the temperature has not yet reached the target, the routine returns to step 104. The monitoring and checking steps 104-108 are periodically repeated until the E-cat temperature reaches the high target value, whereupon at step 110 the controller deactivates the E-cat. The E-cat temperature then decreases (assuming that the engine has not been started in the interim), and step 112 indicates that the controller monitors the decreasing temperature of the E-cat. At step 114, the controller regulates E-compressor speed to track the decreasing temperature of the E-cat. Step 116 indicates the controller querying whether the E-cat temperature has reached a lower target value, which is a predetermined value stored in the controller's memory. If the temperature has not yet decreased to the lower target value, then control returns to step 112 and steps 112-114 are repeated. Once the E-cat temperature reaches the lower target, at step 118 the speed of the E-compressor is ramped down to zero according to a ramp-down schedule stored in memory.

The controller CNTR for directing the steps of the methods in accordance with embodiments of the invention may be any means such as a device or circuitry embodied in hardware, software or a combination of hardware and software that is configured to perform the corresponding functions of the controller as described herein. In some embodiments, the controller may be configured to augment ECU capabilities with respect to turbocharger and secondary air injection operations by identifying engine conditions under which action is to be taken for activating the secondary emissions control system and/or for augmenting engine boost via combined action of the turbocharger and the secondary emissions control system. As such, in an exemplary embodiment, the controller may merely provide additional functionality to the ECU. However, in some embodiments, the controller may be a separate unit from the ECU (i.e., the control unit CNTRL shown in the figures may not comprise the ECU but may be in communication with the ECU).

The controller includes a memory device. The memory device may include, for example, volatile and/or non-volatile memory. The memory device may be configured to store information, data, applications, modules, instructions, or the like for enabling the apparatus to carry out various functions in accordance with exemplary embodiments of the present invention. For example, the memory device could be configured to buffer input data for processing by the processor of the controller. Additionally or alternatively, the memory device could be configured to store instructions corresponding to an application for execution by the processor of the controller.

As noted, the processor of the controller may be a processor of the ECU or a co-processor or processor of a separate controller. The processor may be embodied in a number of different ways. For example, the processor may be embodied as a processing element, a coprocessor, a controller, or various other processing means or devices including integrated circuits such as, for example, an ASIC (application specific integrated circuit), FPGA (field programmable gate array), a hardware accelerator or the like. In an exemplary embodiment, the processor may be configured to execute instructions stored in the memory device or otherwise accessible to the processor. As such, whether configured by hardware or software methods, or by a combination thereof, the processor may represent an entity capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor, which may otherwise be a general-purpose processing element if not for the specific configuration provided by the instructions, to perform the algorithms and/or operations described herein. However, in some cases, the processor may be a processor of a specific device (e.g., the ECU) adapted for employing embodiments of the present invention by further configuration of the processor by instructions for performing the algorithms and/or operations described herein (e.g., by addition of the controller).

In whatever manner the controller is configured and implemented, it is programmed with machine-readable instructions for use by the processer to carry out the steps of the methods of the present invention.

The methods in accordance with the invention require monitoring the changing E-cat temperature. Various techniques can be employed for assessing E-cat temperature. Mathematical modeling of the E-cat can be performed for calculating E-cat temperature via computational techniques based on input power to the heater, ambient temperature, time, and physical and heat-transfer characteristics of the E-cat. It is alternatively possible to empirically derive a time-dependent relationship between E-cat temperature and input power to the heater that takes into account the ambient temperature and potentially other factors, and to calculate E-cat temperature based on said relationship. The invention is not limited to any particular technique for determining E-cat temperature.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A method for operating a secondary emissions control system in an exhaust system of an internal combustion engine (ICE), the secondary emissions control system including an E-cat comprising a catalyst and an electrical heating device proximate the catalyst, and further including an E-compressor comprising a compressor operably coupled with an electric motor for rotatably driving the compressor, the E-compressor being arranged to supply air to the E-cat, the method comprising the steps of:

receiving a command to activate the secondary emissions control system;

upon receipt of said command, activating the electrical heating device of the E-cat and activating the E-compressor;

continually monitoring a characteristic parameter Pe of the E-cat as a function of time as the electrical heating device heats the catalyst;

while the electrical heating device is activated, continually regulating speed Nc of the E-compressor in a manner to change Nc responsive to change in Pe.

2. The method claim 1, further comprising the steps of:

receiving a second command to deactivate the secondary emissions control system;

upon receipt of said second command, deactivating the electrical heating device;

continually monitoring the characteristic parameter Pe of the E-cat as a function of time as the E-cat cools down; and while the electrical heating device is deactivated, continually regulating speed Nc of the E-compressor in a manner to change Nc responsive to change in Pe.

3. The method of claim 2, further comprising the step of ramping the speed Nc of the E-compressor down to zero upon detecting that Pe has reached a predetermined lower threshold value.

4. The method of claim 1, wherein the monitoring step comprises computing Pe based at least in part on a predetermined relationship between input power to the E-cat and elapsed time since activating the E-cat.

5. The method of claim 1, wherein the characteristic parameter Pe comprises a temperature of the E-cat.

6. The method of claim 1, wherein the characteristic parameter Pe comprises voltage divided by input current to the E-cat.

7. A method for operating a secondary emissions control system in an exhaust system of an internal combustion engine (ICE), the secondary emissions control system including an E-cat comprising a catalyst and an electrical heating device proximate the catalyst, and further including an E-compressor comprising a compressor operably coupled with an electric motor for rotatably driving the compressor, the E-compressor being arranged to supply air to the E-cat, the method comprising the steps of:

receiving a command to activate the secondary emissions control system;

upon receipt of said command, activating the electrical heating device of the E-cat and activating the E-compressor;

continually monitoring a characteristic parameter Pe of the E-cat as a function of time as the electrical heating device heats the catalyst;

while the electrical heating device is activated, continually regulating torque Q of the E-compressor in a manner to change Q responsive to change in Pe.

8. The method of claim 7, further comprising the steps of:

receiving a second command to deactivate the secondary emissions control system;

upon receipt of said second command, deactivating the electrical heating device;

continually monitoring the characteristic parameter Pe of the E-cat as a function of time as the E-cat cools down; and while the electrical heating device is deactivated, continually regulating torque Q of the E-compressor in a manner to change Q responsive to change in Pe.

9. The method of claim 8, further comprising the step of ramping the torque Q of the E-compressor down to zero upon detecting that Pe has reached a predetermined lower threshold value.

10. The method of claim 7, wherein the monitoring step comprises computing Pe based at least in part on a predetermined relationship between input power to the E-cat and elapsed time since activating the E-cat.

11. The method of claim 7, wherein the characteristic parameter Pe comprises a temperature of the E-cat.

12. The method of claim 7, wherein the characteristic parameter Pe comprises voltage divided by input current to the E-cat.

\* \* \* \* \*